United States Patent [19]

Buratty

[11] Patent Number: 4,959,907
[45] Date of Patent: Oct. 2, 1990

[54] CIRCULAR SAW ACCESSORY

[76] Inventor: John D. Buratty, R.D. #1, Rockwood, Pa. 15557

[21] Appl. No.: 263,364

[22] Filed: Oct. 27, 1988

[51] Int. Cl.$^5$ .............................................. B23D 45/16
[52] U.S. Cl. ......................................... 30/388; 83/666
[58] Field of Search ......................... 30/388, 396, 122; 83/666, 698

[56] References Cited

U.S. PATENT DOCUMENTS

| | | | |
|---|---|---|---|
| 2,512,970 | 6/1950 | Rogne | 83/666 |
| 3,266,535 | 8/1966 | Brodie | 83/666 X |
| 3,371,691 | 3/1968 | Ehinger | 30/390 |
| 3,783,729 | 1/1974 | Parr | 30/390 X |
| 4,343,214 | 8/1982 | Schadlich | 83/666 X |
| 4,388,848 | 6/1983 | Albert | 83/666 |
| 4,566,511 | 1/1986 | Robinson | 30/122 X |

Primary Examiner—Douglas D. Watts
Attorney, Agent, or Firm—John B. Dickman, III

[57] ABSTRACT

A saw blade and adaptor combination for mounting on a hand held rotary powered saw to make cuts close to and parallel with a wall surface. The adaptor extends beyond the saw guard rail for making such close cuts possible and the saw blade has a recessed mounting for containing saw blade mounting bolt thereby allowing said saw blade to make cuts against and parallel to a wall surface.

2 Claims, 1 Drawing Sheet

CIRCULAR SAW ACCESSORY

BACKGROUND OF THE INVENTION

This invention relates to hand held rotary power saws commonly referred to as circular saws or skill saws and in particular to an adaptor to such saws which position a saw blade beyond a fixed guard rail on the saw, so as to allow the blade to be positioned close to a wall surface in parallel relation thereto.

In the past, power saws could not be used to make cuts close to a wall surface because of the fixed guard rail. Practically all power saws have a fixed guard rail which surrounds the cutting edge of the rotating blade to prevent accidents. The guard rail has a flat table surface which slides over the surface of the object to be cut and is adjustable to limit the depth of cut of the blade.

While the guard rail surrounds the dangerous cutting edge of the blade it also prevents close cuts next to a wall surface. The closest cut is at least the distance from the blade to the side edge of the guard rail. Even the adaptor of U.S. Pat. No. 3,371,691, issued to Ehinger extends beyond the guard rail which is hampered by the washer J and head of bolt 12 which prevents the blade from Cutting next to a wall surface. The adaptor in the Ehinger patent is a cylinder with a closed end that has a lug to hold a blade against spinning on the adaptor.

U.S. Pat. No. 1,883,392, issued to Moll, is directed to a power saw for making plural parallel cuts simultaneously. There is an arbor which threads on the shaft of a motor and spreaders to separate the blades. The particular power saw does not have a surrounding guard rail. Instead there is a hood to cover the blades, leaving the side of the blade exposed.

The present invention not only extends the blade beyond the guard rail, it also provides a saw blade compatable with the adaptor to preform cuts along a wall surface,

OBJECTS OF THE INVENTION

It is an object of this invention to provide an adaptor which can be applied to and removed from the conventional power saw.

Another object is to provide an adaptor and saw blade combination for cutting snugly along a wall surface.

These and other objects will be apparent from the drawing and description.

The invention is illustrated in the drawings in which:

DETAILED DESCRIPTION OF THE DRAWINGS

Figure 1:
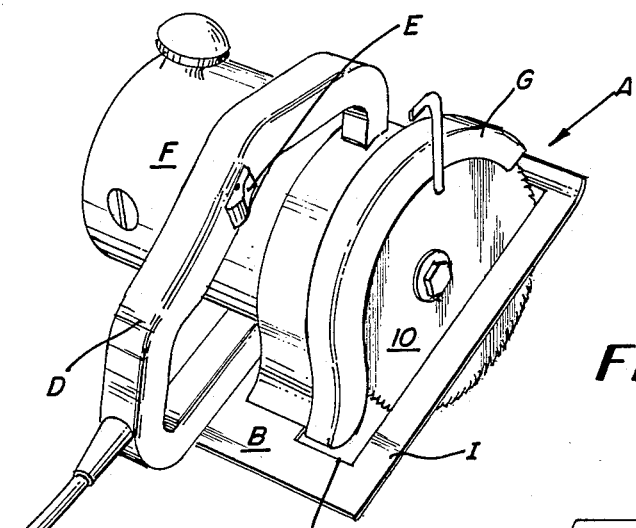
FIG. 1 is a perspective of a hand power saw used with the invention.
Figure 3:
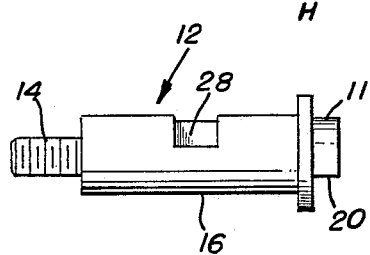
FIG. 3 is a plan view of an adaptor of the invention.

Referring to the drawings there is shown in FIG. 1 a hand held power saw A with a fixed guard rail B surrounding a saw blade 10. The power saw A has a handle D with a trigger switch E to turn electric motor F "on" and "off". The power saw A has a cover G for enclosing a section of the exposed rotating saw blade C. The guard rail B has a slot H through which the saw blade projects to make cuts. The side edge I of the guard rail prevents close cuts along a wall surface Ordinarily the saw blade 10 is held in place on the outer end of the electric motor shaft (not shown) by a bolt, the head of which engages the saw blade with the threaded shank of the bolt screwed into an internally threaded axial bore (not shown) in the outer end of the shaft. Under normal use, the saw blade is mounted on the motor shaft with it's cutting teeth projecting through slot H of the guard rail B. When the blade is mounted to cut close to a wall surface, it is positioned as in FIG. 2.

Taking a closer look as FIGS. 2 through 5, an adaptor 12 of the invention is mounted on the shaft (not shown) of a power saw electric motor F. The adaptor 12 has a threaded end 14 which screws into the motor shaft. A solid cylindrical shaft 16 of the adaptor projects beyond the guard rail B so that a saw blade 10 is free to make close cuts along wall surfaces. Cylindrical shaft 16 has a pair of parallel flat surfaces 28 which an open end wrench will fit on to tighten the adaptor 12 on the motor shaft. To support the saw blade 10 against spinning on the adaptor 12, there is an arcuately shaped end 18 with a flat area 20. An integral washer 22 engages one side of the saw blade 10 and a bolt 24 and washer 26 secure the blade to the adaptor 12, FIG. 5.

Figure 2:
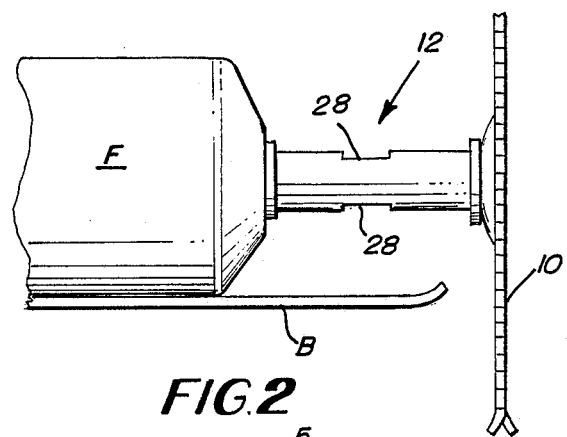
FIG. 2 is a plan view of a hand power saw with an adaptor and saw blade combination of the invention.
Figure 4:
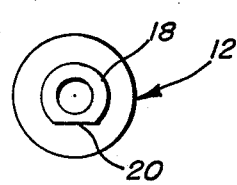
FIG. 4 is an end view of the adaptor of FIG. 3.

Guard rail B adjusts to determine the depth of cut of the saw blade. The forward end of the guard rail is pivotally attached to the front of the saw so that the rear end of the guard rail moves along an arc for exposing the cutting edge of the saw blade which extends below the guard rail as shown in FIG. 2.

Figure 5:
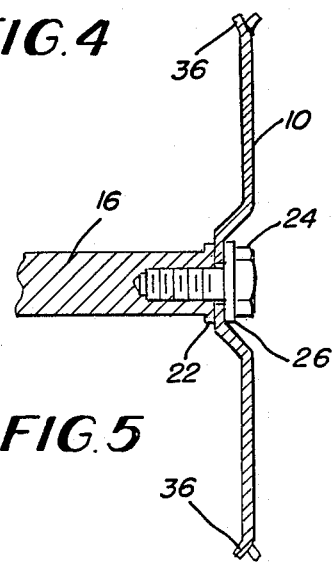
FIG. 5 is a partial side view of a saw blade of the invention.
Figure 6:
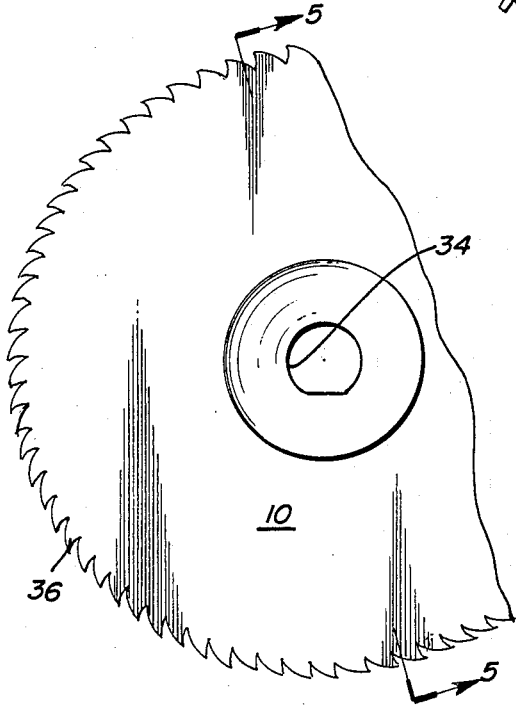
FIG. 6 is a cross sectional view of the saw blade of FIG. 5 taken along the line 6—6.

FIGS. 5 and 6 show a saw blade 10 of the invention. The cross section view of FIG. 5 shows that the center or mounting area 30 of the saw blade having a frusto-conical shape or recessed area 32. The purpose of the recessed area 32 is to position the bolt head 26 within the recess and not to protrude which would affect how close the saw blade can come to a wall surface. There is a mounting hole 34, best seen in FIG. 6, for installing the saw blade on the arcuately shaped end 18 of the adaptor 12. The hole 34 has the same cross sectional shape as arcuately shaped end IB with the flat area 20. It should be realized that the saw blade 10 can only be mounted on the adaptor one way, that is with the frusto-conical shaped center 30 towards the adaptor. Otherwise the teeth 36 will be facing the wrong direction for cutting.

While only one embodiment of the invention has been shown, it should be realized that one skilled in the art may recognize other embodiments. One skilled should consider the drawings, description and claims for a full understanding of the invention.

I claim:

1. An adaptor and saw blade combination for a rotary powered saw of the type embodying a driven rotary shaft having a saw blade receiving lug on its outer end and a threaded axial bore opening through said lug, comprising; and adaptor having an elongated shaft with a first end and a second end, said first end being a screw threaded shank for joining said adaptor to the rotary powered saw rotary shaft, said second end having an integral abutment and shaft for receiving a saw blade with a mounting means, where said shaft and said mounting means mate to prevent said saw blade from spinning on said shaft, a saw blade compatible with said adaptor to allow close cuts parallel to a wall surface, said saw blade having a recessed mounting means of frusto conical shape to conceal a screw threaded mounting fastener, whereby the surface of said saw blade opposite said recessed mounting means is flat to allow said saw blade to cut close to a wall surface, said adaptor elongated shaft has parallel lands for receiving a tightening implement to secure said adaptor to said rotary powered saw rotary shaft, said shaft on said second end of said adaptor has an arcuate cross section with a flat land and said saw blade mounting means has an arcuately shaped aperture with a flat land to mate with said shaft on said second end of said adaptor.

2. An adaptor and saw blade combination as in claim 1 wherein said recessed mounting means of said saw blade is a frusto conical shape where said saw blade has a first right side and a second left side with said left side having said recessed mounting means mounted on said adaptor next to said abutment whereby the saw blade cutting teeth are rotated in a cutting direction.

* * * * *